July 22, 1958 — E. H. KELISH ET AL — 2,844,274

FILLER CAP

Filed April 28, 1954 — 3 Sheets-Sheet 1

EDWARD H. KELISH,
CHARLES A. VINTON,
ROBERT L. BURCHAM,
INVENTORS.

BY Bartholomew & Scantlebury
ATTORNEYS

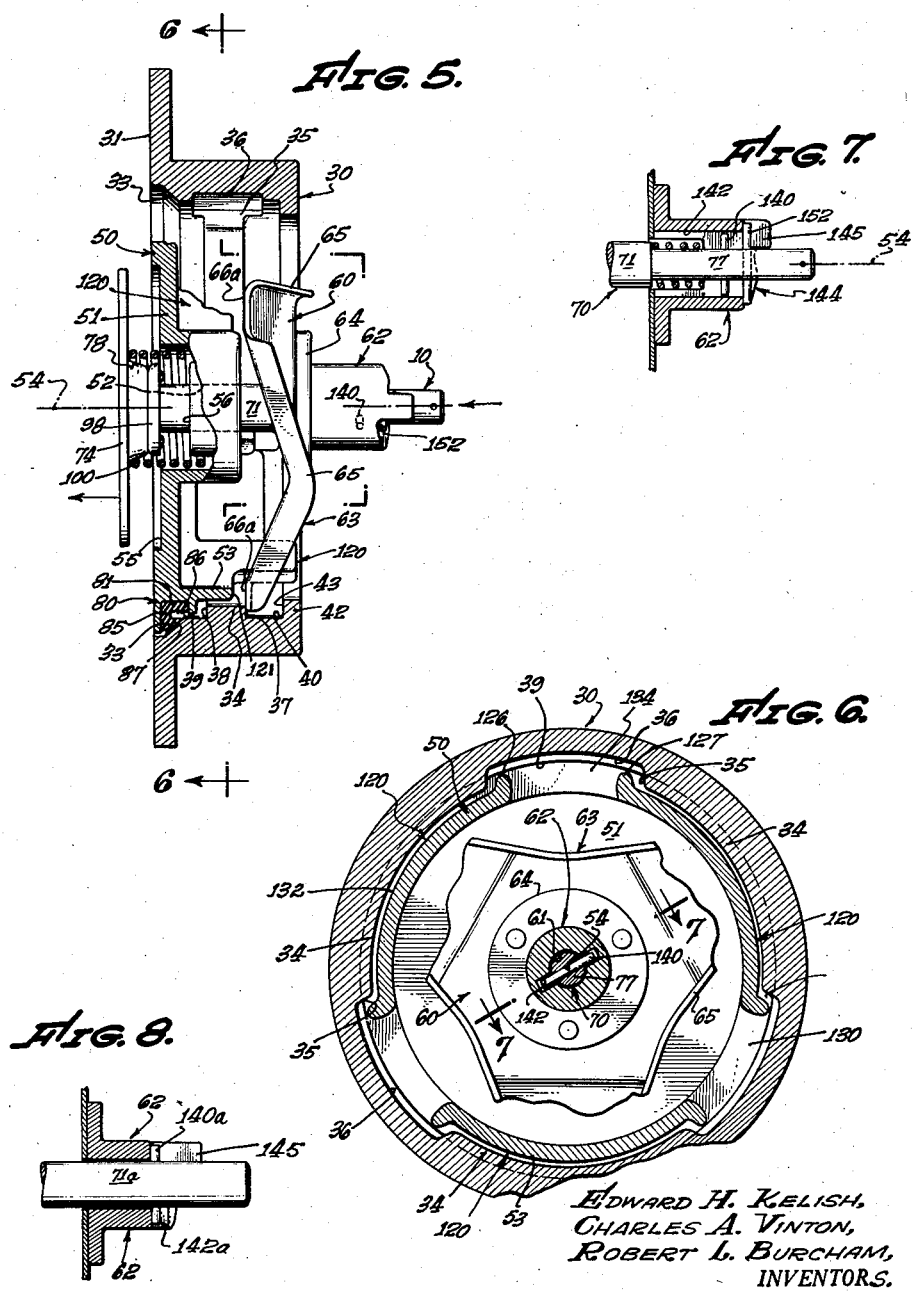

July 22, 1958  E. H. KELISH ET AL  2,844,274
FILLER CAP
Filed April 28, 1954  3 Sheets-Sheet 3
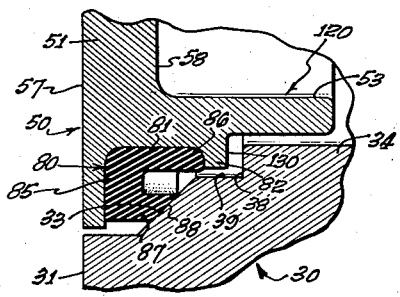
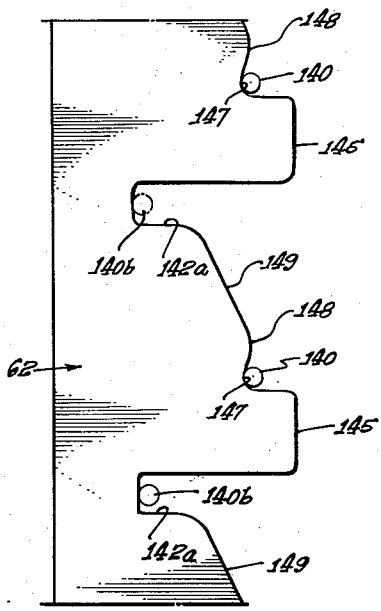
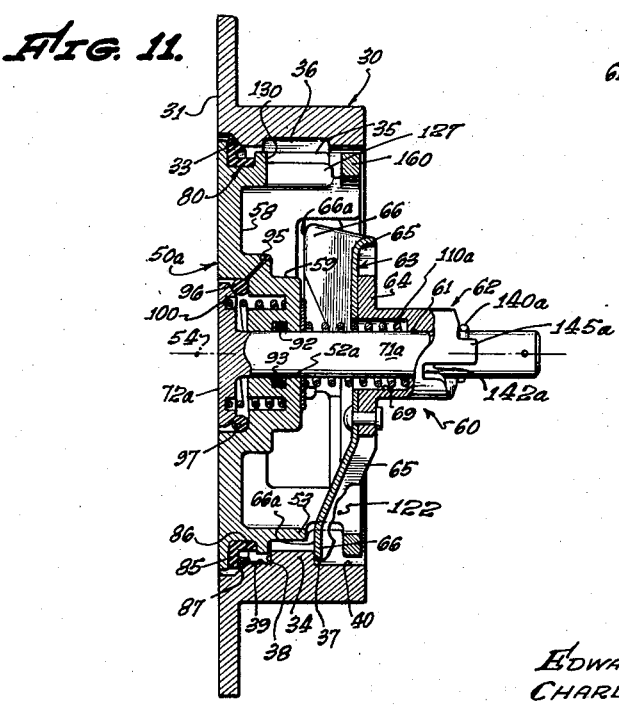
EDWARD H. KELISH,
CHARLES A. VINTON,
ROBERT L. BURCHAM,
INVENTORS.
BY
Barthelew & Scantlebury
ATTORNEY

United States Patent Office 2,844,274
Patented July 22, 1958

2,844,274

FILLER CAP

Edward H. Kelish, West Covina, Charles A. Vinton, Alhambra, and Robert L. Burcham, Los Angeles, Calif., assignors to Universal Metal Products, Incorporated, Alhambra, Calif., a corporation of California Application April 28, 1954, Serial No. 426,119

14 Claims. (Cl. 220—25)

This invention is concerned with caps for releasably sealing openings such as the mouths of pipes, openings in tanks, and the like. The invention is particularly useful for sealing filler openings in tanks for storing liquids, such, for example, as liquid fuel for aircraft, and will be described primarily as it pertains to that general field of use. The term "filler cap" is used herein in the generic sense of a cap for sealing an opening, and without implying any limitation of the function or use of that opening.

An important problem in sealing openings of the type described is the fact that while the cap is in sealing position a pressure differential may build up between the exterior and the interior of the cap, so that it may be dangerous to release the cap abruptly. One aspect of the invention has to do with improved means for providing a breathing position of the cap, which permits equalization of pressures across the cap before it is fully released.

A difficulty with previously available caps that provided a breathing position was that it was sometimes difficult for the operator to determine with certainty whether the cap was in released, breathing, or fully locked condition. An important object of the present invention is to provide a cap that includes means for indicating visually the condition of the cap, so that the operator can determine without any manipulation of the cap, and preferably even by casual inspection from a distance, what its condition is.

In accordance with the invention the cap may be shifted between fully locked and breathing conditions, and may also be shifted between breathing and released conditions by manipulation of a single control member.

In accordance with one aspect of the invention, the control member of the cap is movable axially of the opening, depressed condition of the control member causing it to lie flush with the surface of the cap and corresponding to fully locked condition of the mechanism. In breathing condition of the cap the control member preferably protrudes visibly from the surface of the cap, providing visual indication that the cap is not fully locked and that the breathing aperture is open.

In accordance with another aspect of the invention, the cap is positively retained in the opening while in breathing condition, but with a breathing aperture held positively open for fluid flow in either direction.

A further object of the invention is to provide a breathing condition of a cap in which the cap body is positively retained in the opening, but is held in sealing relation with that opening only by a yielding force, so that it can be lifted by excess pressure within the tank to release that pressure.

A further object of the invention is to provide a cap having a control member that protrudes from the face of the cap by one clearly defined distance when the cap is in breathing condition and protrudes from the face of the cap by a distance that is distinctively greater when the cap is in fully released condition.

Another object of the invention is to provide a filler cap that has a compact and stable relation of parts when in released condition, so that when the cap is removed from the mouth of the aperture no special precautions are required to maintain it in proper condition for replacement.

The invention further provides operating structure that is sturdy and reliable and that is readily manipulated either with a handle of moderate size or with a tool, such as a screw-driver, for example. In preferred form of the invention, the pressure applied to the main seal in fully locked condition of the cap is substantially positive in nature, and is derived by cam action from rotation of the control member through a convenient angle. However, that sealing force may include slight resilience derived from limited resilient deflection of the mechanism itself.

A further aspect of the invention concerns a particularly effective form of sealing gasket for providing a reliably tight seal over a wide range of conditions of the gasket material and without requiring the application of large forces to the cap body. That type of sealing gasket cooperates particularly effectively with a cap mechanism of cam type, in which the cap body is locked in a substantially positively defined position.

A full understanding of the invention and of its further objects and advantages will be had from the following description of certain illustrative embodiments, of which description the accompanying drawings form a part. It will be understood that many changes can be made in the design and construction of the invention without departing from the proper scope of the invention. The particulars of the embodiments herein described are for illustration only, and are not intended as limitations upon the scope of the invention, which is defined in the appended claims.

In the drawings:

Fig. 5 is an axial section corresponding to Fig. 3, but showing the filler cap in breathing position and at enlarged scale;

Fig. 6 is a transverse section on the line 6—6 of Fig. 5;

Fig. 7 is a fragmentary section on line 7—7 of Fig. 6;

Fig. 8 is a fragmentary section corresponding to Fig. 7, but illustrating a modification;

Fig. 9 is a fragmentary section representing a portion of Fig. 3 at enlarged scale;

Fig. 10 is a schematic developed section representing an illustrative cam form in accordance with the modification of Fig. 8; and Fig. 11 is an axial section corresponding to Fig. 3, but representing certain illustrative modifications.

Figure 1:
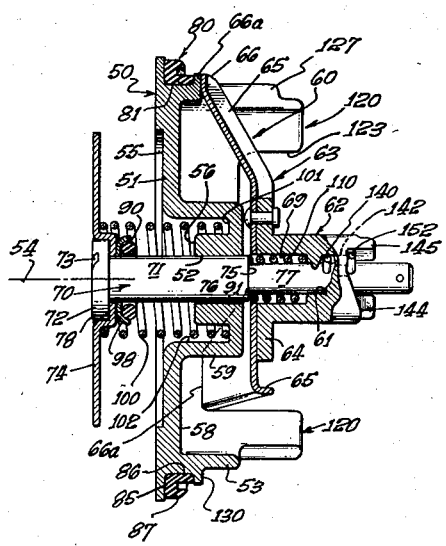
Fig. 1 is an axial section of an illustrative filler cap in accordance with the invention, shown in released position removed from the aperture.

Figs. 1 to 7 and 9 represent an illustrative preferred type of filler cap in accordance with the invention. The opening to be sealed is defined by an adapter 30, which is shown as a cylindrical shell adapted to be installed at the mouth of a pipe or in an aperture in the wall of a tank, for example. The structural features of adapter 30 may alternatively be formed directly as part of the pipe, tank aperture, or the like, that is to be sealed. The aperture to be sealed ordinarily opens inward from a substantially flat front surface represented in the present embodiment as the front face 31 of the adapter. Face 31 may, for example, lie in the skin surface of an aircraft wing or fuselage. It is ordinarily preferred that the front face of the cap be flush with that surface when the cap is fully installed, as in the embodiment illustrated, and particular advantages of that relation will be described. However, that relation is not necessary to other aspects of the invention, and the fully installed cap may protrude from the face 31 or may be set back of that face.

Within adapter 30 and inward of face 31 is an outwardly facing annular sealing surface 33, which is preferably conical, as shown, but which may be of any suitable form to engage sealing means on the cap. Inward of the sealing surface are locking formations, shown typically as of bayonet type and comprising three circumferentially spaced segments 34 of a radially extending inner flange. The end walls 35 of the flange segments are preferably oblique at such an angle that the opposing end walls of adjacent segments are substantially parallel, as shown in Fig. 6, for example, forming axial passageways or channels 36 between the two cylindrical wall portions 39 and 40 of the adapter, which are respectively forward of and behind locking formations 34. Channels 36 are preferably relieved below the level of wall portions 39 and 40. The rearward faces of locking formations 34 form axially facing lands 37 of interrupted annular form, which provide the locking faces of the adapter. The forward faces of the locking formations may similarly form axially facing lands 38, which may positively define the axial position of the installed cap. An inner flange 42 of the adapter may be provided inward of locking formations 34 with a forward annular face 43, which may act as a stop surface for a purpose to be described.

The cap, as illustratively shown, comprises three primary relatively movable parts, a cap body 50, a locking member 60, and an operating member 70, typically in the form of a stud. Cap body 50 comprises a disk-like plate portion 51 having a through bore 52 on the axis 54 of the entire cap, and an interrupted flange 53 extending axially inward from the inner face of disk 51 near its periphery. Cap body 50 carries an outer peripheral sealing means adapted to engage sealing face 33 of adapter 30 and to produce a pressure seal between the periphery of the cap body and the adapter. That outer sealing means is shown typically as the gasket 80, which may be of any suitable type, but is preferably of the special form shown, to be described.

Stud 70 includes a shank 71, the outer part of which is slidably and rotatably received in bore 52 of cap body 50 and the inner part of which is similarly received in the axial bore 61 of locking member 60. Cap body 50 and locking member 60 are thereby connected in coaxial relation with limited freedom of movement both axially and rotationally with respect to each other and to stud 70. The stud has a head portion 72 in which is provided any suitable type of handle means, such as the formation 73, which is shown as a conventional diametral slot adapted to cooperate with a tool to facilitate manual rotation and inward axial movement of the stud. As illustrated, a cover disk 74 is fixedly mounted on the forward end of the stud shank. The central portion of cover disk 74 is inwardly dished at 78 to receive the stud head, and the main part of the disk extends radially flush with the face of stud head 72. A recess 55 may be provided in the forward face 57 of cap body 50 to receive cover disk 74.

An auxiliary releasable sealing means is provided, operable independently of peripheral seal 80. As shown, that auxiliary seal acts between cap body 50 and stud 70 and selectively seals and releases fluid flow through bore 52 along the outer face of stud shank 71. Such a seal may typically comprise an O-ring 90 immediately surrounding shank 71 at its head end and adapted to be compressed between the stud head and an annular face 56 of the cap body by virtue of inward movement of the stud with respect to the cap body. A retainer washer 98 of cup form is preferably inserted between O-ring 90 and the stud head to insure effective sealing action. Outward movement of the stud relative to the cap body releases O-ring 90, permitting limited fluid flow through the cap assembly between bore 52 and shank 71. Such "breathing" flow, as will be explained, is useful to permit equalization of pressure in either direction between the interior and exterior of the cap. If the fluid flow through the relatively small crack between bore 52 and stud shank 71 is not sufficient for that purpose, the rate of flow may be increased, for example by providing one or more axial channels in one of those surfaces, as indicated typically at 91 in the wall of bore 52. Such a channel, if not too deep, is sealed and opened by O-ring 90 under the same type of control already described.

Alternatively, for example, a permanent seal may be provided between the stud and the cap body, and additional passage means may be provided independent of bore 52 for controlled breathing flow through the cap assembly. Fig. 11 illustrates a modification embodying illustrative structure of that type. The O-ring 92 is received in the radial channel 93 in the wall of axial bore 52a of the cap body 50a in a manner to be slidable with the cap body along stud shank 71a and to maintain a pressure seal between those members in all relative positions thereof. A special breathing passage is shown illustratively in the cap body at 95, the outer mouth of that passage being releasably sealable by the O-ring 96 when the latter is compressed by the oblique face 97 of stud head 72a. The number and size of passages such as 95 may be varied to obtain substantially any desired rate of flow when seal 96 is released by outward axial movement of the stud. And that flow is shut off, as in the preferred embodiment, by inward axial movement of the stud relative to the cap body. An advantage of the preferred embodiment, as compared with the modified form of Fig. 11, is that the single sealing means represented at 90 performs a dual function, which in Fig. 11 requires two separate seals 92 and 96.

In accordance with one aspect of the invention, resilient means are provided, acting between cap body 50 and stud 70 and tending to move them axially in mutual directions to release the auxiliary sealing means. In accordance with another aspect of the invention, that resilient means tends to move the stud outward with respect to the cap body so that, in released condition of the seal, the stud head, and also cover disk 74 in the preferred embodiment, protrude outwardly from the common plane of adapter face 31 and the front face of the cap.

Figure 3:
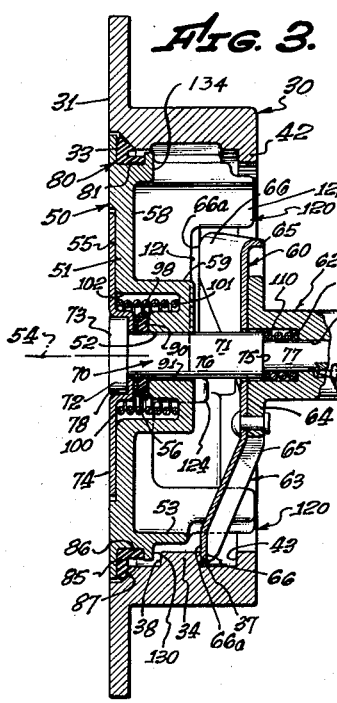
Fig. 3 is an axial section corresponding to Fig. 1, but showing the filler cap in locked position in an illustrative adapter.

As illustrated, that resilient means comprises the coil spring 100, which is coaxial with the stud shank and acts between the inner face of cover disk 74 and the bottom annular face of a relatively deep well 102 formed in the front face of the cap body radially outward of auxiliary sealing face 56. That well is deep enough to receive spring 100 when compressed, as shown in Fig. 3, for example. To accommodate that well, the inner face 58 of cap body 50 may be formed with a central boss 59, which also gives bore 52 sufficient length to provide effective guiding of the relative movement of the cap body and stud.

Figure 4:
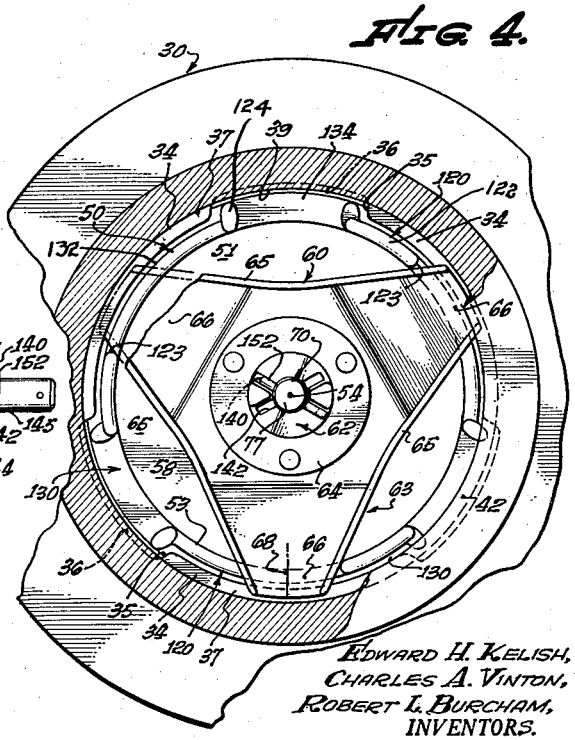
Fig. 4 is a rear elevation, partially cut away, corresponding to Fig. 3.

Locking member 60 has an axial bore 61 and comprises a hub portion 62 and a locking portion which is typically represented as a spider 63 rigidly mounted, as by the rivets 67, on an axial mounting flange 64 at the forward end of hub 62. Spider 63 is formed as a substantially triangular plate with stiffening flanges 65 along the sides of the triangle, and with the corners slightly rounded to form three bayonet locking arms 66. The working faces 66a of arms 66 are adapted to engage the rearward lands 37 of the respective adapter locking formations 34. As shown, the spider arms are offset forwardly to bring their ends into the plane of the lands 37 when the cap is in locked condition (Figs. 3 and 4). Alternatively, the spider may be substantially flat, the adapter being extended rearwardly to bring locking formation 34 into proper relation with the spider arms. An advantage of the illustrated arrangement is that the overall depth of the adapter may be relatively small. Working faces 66a of spider arms 66 are preferably convexly cylindrically curved about axes directed radially with respect to cap axis 54, so that they engage lands 37 along radial lines such as that indicated at 68 in Fig. 4. The arms of the spider are preferably somewhat resilient, and are arranged to be deflected rearwardly when fully engaged in locked position of the cap, insuring tightness of the latter in the adapter.

Resilient means are preferably provided to yieldingly urge locking member 60 rearwardly with respect to stud 70 and cap body 50. As illustrated, that function is performed by the coil spring 110, acting between the stud and the locking member. Bore 61 may be counterbored, as indicated at 69, at its forward end to receive spring 110. The forward end of the spring may engage a shoulder 75 formed on stud shank 71 between the forward portion 76 of larger diameter that guides cap body 50 and the rearward shank portion 77 of smaller diameter that guides locking member 60. The diameter of counterbore 69 is preferably larger than the diameter of forward shank portion 76, so that the latter may enter the bore in locked position of the cap (Fig. 3). Shank portion 76 may help to guide the locking member in that position, but it is ordinarily preferred to avoid such guiding by ample clearance and to provide adequate guiding of the locking member on rearward shank portion 77.

Many other types of resilient means may be employed in place of spring 110, just described. For example, the resilient means may act directly between locking member 60 and cap body 50, as illustratively shown in Fig. 11. The entire length of the stud shank may then be of uniform diameter, as indicated at 71a in Fig. 11. A coil spring 110a may be employed, similar to that of the previously described embodiment, engaging at its forward end the rearward face of the cap. The body of the locking member is preferably counterbored, as at 69a, to receive the rearward end of the spring, to afford it adequate length when compressed. For reasons to be explained, any spring means of that type, acting between the locking member and the stud body, preferably exerts an appreciably smaller force than that of spring 100, already described, so that when the two springs work against each other, the latter takes command.

Outer sealing gasket 80, as is shown best in Fig. 9, is mounted on cap body 50 in a peripheral channel 81 which faces radially outward. In accordance with one aspect of the invention, sealing gasket 80 is of general U-section, with radially extending web 85 and with inner and outer flanges 86 and 87, respectively, extending axially rearwardly. The rearward wall 82 of channel 81 extends radially only far enough to retain inner flange 86 of the gasket. Outer gasket flange 87 ends in a working face 88, which may be oblique, as shown, with an angle that corresponds to that of sealing face 33 of adapter 30. The two faces 88 and 33 are so arranged as to engage each other with firm pressure when the cap is installed in the adapter. Relatively light pressure of that type is sufficient to withstand moderate pressure differentials between the interior and exterior of the cap. The interior pressure acts on the opposing faces of gasket flanges 86 and 87, tending to move them apart. Any increase of the inner pressure therefore tends to move outer gasket flange 87 radially outwardly, increasing the tightness of its sealing engagement of adapter face 33. The oblique angle of the latter face prevents any appreciable movement of the gasket, but its sealing action becomes tighter the higher the pressure that must be retained. Moreover, a sealing gasket of the described form is particularly effective in compensating slight changes in position of the parts, or expansion or contraction of the gasket material itself, such as may occur under extreme conditions of use.

The interrupted flange 53 of cap body 50 comprises three identical flange segments 120 that extend inward from an inner annular surface 130 immediately to the rear of channel 81 which holds gasket 80. Adjacent flange segments 130 are spaced circumferentially, leaving surface 130 unoccupied in three uniformly spaced areas or lands 134. Those lands are large enough in their circumferential dimension to receive the ends of the arms 66 of spider 63. When the rotational position of the spider with respect to the cap body is such that the spider arms are axially aligned with lands 134, the spider may move forward until working faces 66a of its arms engage those lands. When the spider is in that position, as in fully released condition of the cap, segments 120 define the rotational position of the spider relative to the cap body. Surface 130 may be considered as a radial extension of rear face 58 of the cap body, the difference in level of those faces serving primarily to lighten the structure. Each flange segment 120 comprises a relatively long and low uniform portion 121. At the right hand end of each flange segment, as viewed from the inner side of the cap (Figs. 2 and 4), is a relatively low stop lug 124, which rises abruptly, but only a short distance, above the low portion of the flange. At the left hand end of portion 121 of each flange segment is a relatively high flange portion 122 which continues to the left end of the flange. The sharp rise between flange portions 121 and 122 forms a relatively high stop lug 123.

Flange segments 120 are spaced radially inward of the outer edge of annular surface 130, the portions of that surface directly outward of the flange segments forming three rearwardly facing lands 131. Each of those lands is terminated circumferentially by wings that extend radially outward from the ends of flange segments 120. The right hand wing 126 of each flange segment may comprise a radial extension of lower stop lug 124. The left hand wings 127, as shown, are formed as radial extensions of the higher flange portions 122, but are not as high above surface 130, to avoid interference with adapter flange 42.

The described structure provides in a particularly convenient manner three axial channels 132 in the radially outer surface of the cap body, those channels being open at their rearward ends and preferably terminating at their forward ends in flat walls. In the present embodiment, each channel 132 extends circumferentially between the wings 126 and 127 of a flange segment 120, and terminates forwardly at a land 131. When the cap is inserted axially into adapter 30 in any one of three suitable rotational positions, cap channels 132 receive respective locking formations 34 of the adapter, as shown in Fig. 6, for example. In any other rotational position, the wings 126 or the wings 127 engage respective locking formations 34 of the adapter and prevent insertion of the cap. Locking formations 34 thus cooperate with cap channels 132 to define the relative rotational relation to the cap body in the adapter. The axial position of the fully inserted cap body in the adapter may be positively defined by seating of lands 131 of the cap on outer faces 38 of the locking formations of the adapter, that position being such as to produce firm engagement of gasket face 88 and sealing face 33 of the adapter, as already indicated. In fully inserted position of the cap, whether defined in that manner or not, the rearward faces 37 of adapter locking formations 34 are spaced axially in a definite manner with respect to flange segments 120 of the cap, namely, to the rear of lower flange portions 121, well forward of higher stop lugs 123, and slightly forward of lower stop lugs 124.

An important aspect of the invention concerns the means provided for controlling axial and rotational movement of locking member 60 by means of control stud 70. Interrelated coupling means of two types are provided. One coupling means prevents relative rotational movement of the locking member and stud when they are in one relative axial relation and permits such movement when they are in another relative axial relation. The second type of coupling means produces relative axial movement of the locking member and stud by virtue of their relative rotational movement. In the present embodiment the first type of coupling means comprises a diametral pin 140 fixed in stud shank 71 with both ends projecting a limited distance, and cooperating axial channels 142 in bore 61 of locking member 60. Channels 142 are open at the rearward end of hub 62, and pin 140 is so placed in stud shank 71 that, provided the parts are in suitable relative rotational position (Figs. 1, 2, 5 to 8, for example), the pin ends can enter and leave slots 142 in response to axial movement of the stud forward and backward, respectively, with respect to the locking member. In forward relative position of the stud, with pin 140 in channels 142, relative rotation of the locking member with respect to the stud is prevented. In rearward relative position of the stud, with pin 140 free of channels 142, such relative rotation may take place.

The second type of coupling means, in the present illustrative embodiment, comprises cam means acting between the stud and the locking member by virtue of their relative rotation. Whereas many types of cooperating cam formations are known, the present embodiment employs axial cam faces, formed on the rearward surface of locking member hub 62 and indicated generally by the numeral 144. A convenient type of cam follower is a diametral coupling pin fixed in stud shank 71, which pin may be, and preferably is, the same pin 140 already described as a part of the first coupling means. Duplicate cam faces are provided for cooperation with the respective ends of the pin.

Relative axial movement of the control stud and the locking member is preferably limited by suitable stop means. When pin 140 is not aligned with channels 142, forward movement of the stud relative to the locking member is limited by pin 140 striking the face of cam 144, the axial position at which such limitation occurs depending upon the height of the cam at the pin. When pin 140 is aligned with the channels, the cam is not operative and other means for limiting forward movement of the stud are preferably provided. For example, a stop formation such as a second diametral pin 152 may be fixed in the stud shank in position to engage any convenient point of cam 144 when pin 140 is in channels 142. As shown, the stop pin 152 is placed in axial alignment with coupling pin 140, and is made sufficiently long that its ends project radially beyond channels 142 and strike the cam face at its lowest points. Stop pin 152 is set in shank 71 far enough back of coupling pin 140 to permit the latter pin to enter and securely engage channels 142.

An alternative form of stop means for limiting the forward axial movement of the stud relative to the locking member when coupling pin 140 is aligned with channels 142 is shown illustratively in Figs. 8, 10 and 11. That form of stop means is provided by limiting the forward extent of channels 142, and allowing coupling pin 140 to perform the stop function by engaging the forward ends of the channels. It is then preferred to extend the channels radially through the wall of hub 62, so that they take the form of radial slots of limited axial depth cut in cam faces 144, as shown at 142a. In that form of the invention, coupling pin 140 may extend radially the full width of cam faces 144, as at 140a (Fig. 8). Since pin 140a of Figs. 8, 10 and 11 performs the axial stop function as well as the other functions performed by pin 140 of the previously described embodiment, stop pin 152 of that embodiment may be omitted.

Cam 144 is preferably of the type shown schematically in Fig. 10, the working portions of the cam extending between two diametrically opposed stop lugs 145. Movement of coupling pin 140 or 140a downward in Fig. 10 corresponds to clockwise, or right handed, rotation of stud 70 (as seen from the front of the cap) with respect to locking member 60. Such clockwise rotation moves the coupling pin to the fully actuated position indicated in solid lines in Fig. 10, where further movement is positively blocked by stop lugs 145. That position, in which the pin rests in slight depressions 147 in the cam faces, corresponds to fully locked condition of the cap. By counterclockwise rotation of stud 70, the coupling pin may be shifted from that position over the crests 148 of the cam face, and down the oblique faces 149 to fully released position at the lowest point or trough of the cam, where further counterclockwise movement is again positively blocked by stop lugs 145. During such rotation, contact of the pin and the cam faces tends to be maintained by the action of spring 110, and, under normal conditions of use, also by the action of spring 100 and forces transmitted between cap body 50 and locking member 60 through adapter 30.

The same relative rotational position of stud 70 and locking member 60 that places the second coupling means in released position, with coupling pin 140 or 140a at the troughs of cam 144, also places the parts in rotational position for locking action by the first coupling means, with the coupling pin in alignment with channels 142 or 142a. From that rotational position, forward axial movement of the stud relative to the locking member, which movement is yieldingly urged by the spring action already described, causes the pin to enter channels 142 or 142a, as indicated in Fig. 10 at 140b, locking the parts against further relative rotation in either direction. That locking action is releasable by opposite relative axial movement of the stud and locking member.

Rearward movement of locking member 60 is also preferably positively limited with respect to cap body 50 by any suitable means capable of producing that action without interfering with relative rotational movement of those parts. Since that type of stop action is required only while locking or unlocking the cap in the adapter, it may be produced by suitable stop formations on the adapter. For example, a continuous inner flange 42 may be provided on adapter 30, as already described, spaced inwardly of locking formations 34, and of sufficient radial extent to engage the ends of spider arms 66. Sufficient space is provided between locking formations 34 and stop flange 42 of the adapter to permit spider arms 66 to swing freely between them.

Alternatively, stop formations for the function just described may act directly between the cap body and locking member 60. For example, stop formations may be mounted on the most rearward portions 122 of flange segments 120, and extend circumferentially therefrom. Such formations preferably comprise a continuous ring, as indicated at 160 in Fig. 11, that is spaced rearwardly from the cap body except where it is supported by the higher portions 122 of the flange segments. Such a ring may, for example, be formed integrally with flange segments 120 and cap body 50 by a casting operation. The ends of the spider arms can readily be inserted forward of ring 160 before stud 70 is installed. Their engagement with the forward face of the ring then limits rearward axial movement of the locking member with respect to the cap body. An advantage of that type of stop means is that no special structure is required on the adapter.

Figure 2:
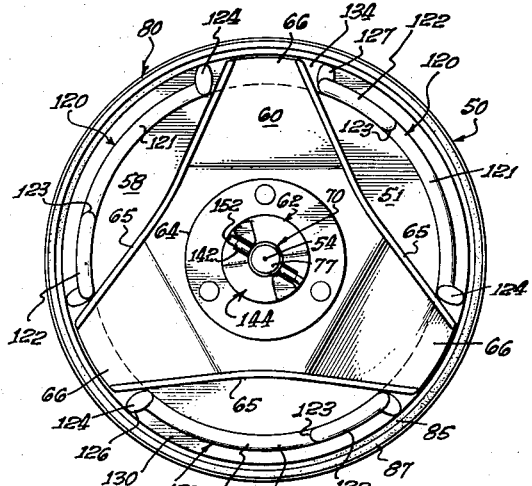
Fig. 2 is a rear elevation corresponding to Fig. 1.

When the filler cap of the preferred embodiment is not in use, it is normally in the condition shown in Figs. 1 and 2. Stud 70 is then held by spring 100 at its extreme forward position with respect both to locking member 60 and to cap body 50. Stud 70 is in such rotational position with respect to locking member 60 that coupling pin 140 is in channels 142, with stop pin 152 engaging the cam face 144 and limiting forward movement of the stud relative to the locking member (Fig. 7). The locking member is in such rotational position with respect to cap body 50 that the ends of spider arms 66 are aligned with lands 134, and are yieldingly held in firm engagement with them by action of spring 100. The forward end of that spring exerts a forward thrust upon stud 70, which thrust is transmitted via stop pin 152 to the spider. In that relative axial position of the spider and cap body, their relative rotation is locked by flange segments 120. Released condition of the cap is clearly indicated to the operator by the relatively great protrusion of stud head 72 and cover disk 74 from the front face of the cap body. Breathing passage seal 90 is released, permitting limited fluid flow through the body of the cap.

To install the cap, it is inserted in adapter 30 in any one of the three rotational positions in which each of the locking formations 34 of the adapter is received by one of the axial channels 132 defined by the radially outer face and the wings 126 and 127 of a cap flange segment 120. In such rotational position, the cap freely enters the adapter until stopped by engagement of sealing gasket 80 and face 33 of the adapter. If desired, index marks, not shown, may be provided on the front face of cap body 50 and on adapter face 31 to facilitate such placement or to indicate a preferred one of the three possible rotational positions, but that is ordinarily not necessary since it is impossible to insert the cap body in the adapter in incorrect rotational position. Moreover, if spider 63 is not in the released position described (Figs. 1 and 2) the cap cannot be inserted at all, since spider arms 66 then strike the forward faces of adapter locking formations 34. With the cap fully inserted but not yet locked in place, the fact that it has not been locked is made clearly evident by the persisting protrusion of stud 70 from the front face of the cap.

The cap may be locked in position in two stages, which may be carried out separately, or may be performed as substantially a single operation. For the first stage, stud 70 is first pressed inward, compressing spring 100, until the yielding resistance to such inward movement is felt to increase abruptly; the stud is then rotated clockwise (in the present embodiment) as far as it will go, which is typically about 60 degrees. As the stud moves axially inward, spring 110 maintains locking member 60 against its axial stop pin 152, carrying spider 63 inward with the stud. When the spider is stopped, as by engagement of its arms with adapter flange 42, further inward movement of the stud can take place only by compression of spring 110 as well as spring 100. The additional resistance of spring 110 is readily felt by the operator. In that position the spider is no longer confined by segments 120 against clockwise rotation, since spider arms 66 are back of stop lugs 124 of the cap. The described clockwise rotation of the stud then carries spider 63 with it, since pin 140 is still engaged in channels 142. The spider arms pass freely back of stop lugs 124 and strike the axial faces of higher stop lugs 122, blocking further stud rotation. That movement carries the spider arms into axial alignment directly back of locking flanges 34 of the adapter. If the stud is released at that point, it is moved forward by spring 100 carrying the spider with it, until spider arms 66 strike the rearward working faces 37 of adapter locking flanges 34, positively blocking further forward movement of the spider and also of the stud. The cap is thereby positively retained in the adapter. The cap body, however, is not rigidly fixed, but is yieldingly urged inwardly only by action of spring 100. Moreover, breathing passage seal 90 is still released, permitting pressure equalization through the cap. That intermediate breathing position is shown in Figs. 5 and 6.

To perform the second stage of the locking operation, the operator presses stud 70 inward more firmly than before, compressing spring 100 and, after the spider arms strike adapter stop flange 42, compressing spring 110 also. That axial movement may be continued until stud head 72 and cover disk 74 seat on the forward face of cap body 50. In any case, it is continued until pin 140 is lifted clear of channels 142, unlocking relative rotation of the stud and locking member. The operator then rotates the stud clockwise, causing pin 140 to ride up cam 144, that cam being positively prevented from turning by engagement of spider arms 66 and higher stop lugs 123 of cap flange segments 120. That stop action is positive, since the spider arms are prevented, as by adapter flange 42, from passing back of lugs 123. Cam 144 produces relative axial movement of the stud and the locking member, the stud being drawn inwardly and the locking member outwardly. That action first moves the locking member forward against the force of spring 110, lifting spider arms 66 from stop flange 42 and pressing their working faces 66a against adapter locking formations 34, blocking further forward movement. Continuing cam action then moves stud 70 inwardly until cover disk 74 seats positively on the front face of the cap body, unless such seating has already been produced by direct inward pressure on the stud. Auxiliary seal 90 is thereby compressed to a predetermined positively limited degree, cutting off breathing flow of air or liquid through the cap. The parts are preferably so proportioned that final movement of pin 140 over cam crests 148 and into locking depressions 147 at the top of cam 144 (Fig. 10) places locking member hub 62 and cap body 50 in positively defined relative axial positions, those positions being such that spider arms 66 are somewhat deflected resiliently and the resulting yielding force appearing as a sealing force urging main sealing gasket 80 inward against adapter sealing face 33. The cam depressions 147 prevent accidental release of the cap. The resulting fully locked position of the cap is shown in Figs. 3 and 4.

That described procedure applies also to the illustrative modification of Fig. 11, the only points requiring specific comment having to do with spring 110a, which acts in that embodiment between locking member 60 and the cap body rather than the stud. With that arrangement, spring 100 must be appreciably stronger than spring 110a, so that, for example in breathing position of the cap (not specifically illustrated for that embodiment), the net force of the two springs upon the cap body will be inward, tending to hold the cap body in fully seated position; and so that the net force of the two springs on stud 70 will be outward, insuring the desired "pop-up" action of the stud head to indicate that the cap is not fully locked. With that embodiment, when the operator presses the stud inward to shift from released to breathing condition, for example, the force that he must overcome is only that of the difference between the respective forces exerted by the two springs. And when the spider arms strike stop ring 160, the force required for further depresssion of the stud becomes that of spring 100 alone. Therefore, with spring 100 appreciably stronger than spring 110, the feel of the mechanism may be made substantially the same as that of the preferred embodiment, and the action is correspondingly similar.

To release the cap, the stud is rotated counter-clockwise. Depending upon the detailed form of cam 144 and other structural features, the first result of such rotation may be to turn the spider also, causing spider arms 66 to slide along the working faces 37 of adapter locking formations 34. Such spider rotation is stopped almost at once by lower stop lugs 124, which project back of the faces 37 and prevent further rotation of the spider. Further stud rotation then forces coupling pin 140 out of locking depressions 147 and over crests 148 of cam 144. The pin then slides down the main working faces 149 of the cam until stopped by cam lugs 145. In that position of the cap, coupling pin 140 is axially aligned with channels 142. Release of the stud therefore permits spring 100 to move the stud axially forward with respect to both the locking member and the cap body, inserting pin 140 into channels 142 until stopped by stop pin 152. That forward movement of the stud into breathing position does not require complete release of inward pressure on the stud, but takes place if that manual pressure is insufficient to prevent expansion of spring 100. That spring is preferably made relatively strong, so that it tends to take control as soon as pin 140 is aligned with channels 142, overcoming any inward pressure on the stud that is normally applied for the purpose of rotating it to release the cam. The described forward movement of the stud releases auxiliary seal 90, positively opening the breathing passage to permit pressure equalizing flow of air or liquid in either direction. However, the cap still cannot be removed from adapter 30, since spider arms 66 are still engaged behind locking formations 34. The resulting intermediate, or breathing, condition of the cap is illustrated in Figs. 5 and 6.

To release the cap from its breathing position, the stud is pressed inwardly against the force of spring 100 until spring 110 has lifted the spider arms from locking formations 34 and carried them into position back of the rearward ends of stop lugs 124. That movement may be carried to the point where the spider arms engage adapter stop flange 42, but is not carried far enough to remove coupling pin 140 from channels 142, which would require compression of spring 110. The stud is then rotated counter-clockwise, carrying the spider arms over stop lugs 124 and into axial alignment with lands 134. Rotation of the spider is positively stopped in that position by engagement of the spider arms with the high ends of flange segments 120, at wings 127. The stud is then released, permitting spring 100 to move the stud and locking member forward until stopped by engagement of spider arms 66 with lands 134 of the cap body. The cap is then in fully released condition, shown in Figs. 1 and 2, and may be lifted out of the adapter.

Fig. 11, as has been pointed out, represents an illustrative embodiment that incorporates several modifications. Although shown together for clarity of illustration, it is to be understood that many features of those modifications are distinct, and may be employed independently or in any desired combinations. Furthermore, for example, the number of cooperating locking formations may be either greater or less than three. All of the modifications specifically mentioned herein are merely illustrative of the wide variations in structure that may be provided within the scope of the invention.

We claim:

1. A filler cap for an opening that extends inwardly from a surface and has locking formations inward of the surface, said filler cap comprising a cap body having an axial bore, peripheral sealing means adapted to seal the opening when the cap body is inserted therein, a control stud mounted in the bore of the cap body and axially and rotatably movable with respect thereto, a locking member mounted on the stud inwardly of the cap body and axially and rotatably movable with respect to the stud, the locking member being adapted to enter the opening when in one rotational position and to engage the locking formations of the opening when in another rotational position, a radially extending lug fixedly mounted on the stud inwardly of the cap body, structure on the locking member forming an axially extending guideway adapted to receive the lug by virtue of relative axial movement of the stud and the locking member in one direction and thereby to positively prevent relative rotation of the stud and locking member, and structure on the locking member forming a face cam adapted to engage the lug by virtue of relative rotation of the stud and the locking member only when the lug is free of the said guideway, and to cause relative axial movement of the stud and the locking member in the opposite direction.

2. A filler cap as defined in claim 1, and including resilient means acting between the stud and the locking member and yieldingly urging their relative axial movement in a direction tending to move the lug into the guideway.

3. A filler cap as defined in claim 1, and including resilient means acting between the stud and the cap body and yieldingly urging the stud in a direction tending to cause the lug to enter the guideway.

4. A filler cap for an opening that extends inwardly from a flat outer face and has a sealing formation inward of the face and has locking formations inward of the sealing formation, said filler cap comprising a cap body having an axial bore, peripheral sealing means carried by the cap body and adapted to engage the sealing formation when the cap body is inserted in the opening, a control member mounted in the bore for rotational and axial movement with respect to the cap body, a locking member carried on the control member inwardly of the cap body and adapted to enter the opening when in one rotational position and to engage the locking formations in the opening when in another rotational position, the locking member being axially and rotationally movable with respect to the control member, cam means comprising a cam face on one said member and a cooperating cam follower on the other, said cam means being actuable by virtue of relative rotation of the control member and the locking member to cause relative axial movement of the locking member outwardly with respect to the control member, the cam face having a recess adapted to receive the cam follower when the said members are in a definite relative rotational relation, and resilient means tending to move the members relatively in a direction to insert the cam follower into the recess, engagement of the cam follower in the recess providing a positive driving connection for rotating the locking member between its said rotational positions.

5. A filler cap for an opening that extends inwardly from a flat outer face and has a sealing formation inward of the face and has locking formations inward of the sealing formation, said filler cap comprising a cap body having an axial bore, peripheral sealing means carried by the cap body and adapted to engage the sealing formation when the cap body is inserted in the opening, a control stud journaled in the bore for rotational and axial movement with respect to the cap body, a locking member carried on the stud inwardly of the cap body and adapted to enter the opening when in one rotational position and to engage the locking formations in the opening when in another rotational position, the locking member being axially and rotationally movable with respect to the stud, cam means comprising a cam face on the locking member and a cooperating cam follower on the stud, said cam means being actuable by virtue of relative rotation of the stud and the locking member to cause relative axial movement of the locking member outwardly with respect to the stud, the cam face having an axially extending recess adapted to receive the cam follower by virtue of outward axial movement of the stud when the stud and locking member are in a definite rotational relation, engagement of the cam follower in the recess providing a positive driving connection for rotating the locking member between its said rotational positions, resilient means tending to move the stud axially outward with respect to the cap body, the stud being manually movable axially inward against the force of said resilient means, resilient means tending to cause the locking member to move axially inward with the stud, and stop means acting to limit the said inward movement of the locking member.

6. A filler cap for an opening that extends inwardly from a surface and has locking formations inward of the surface, said filler cap comprising a cap body, peripheral sealing means adapted to seal the opening when the cap body is inserted therein, a control member mounted on the cap body for rotational movement and for axial translational movement with respect thereto, a locking member mounted inwardly of the cap body and adapted to enter the opening when in one rotational position and to engage the locking formations of the opening when in another rotational position, spring means yieldingly urging inward axial movement of the locking member with respect to the control member, cooperating coupling formations carried by the control member and the locking member, respectively, and engageable by virtue of said spring urged movement of said members, said coupling formations when so engaged providing a positive driving connection for rotational movement between the control member and the locking member, seal tensioning means actuable only when said formations are disengaged to cause inward axial movement of the control member relative to the locking member by virtue of relative rotation of those members, and stop means for limiting the inward axial movement of the locking member independently of the control member, the control member being movable inwardly, when said stop means are engaged, to compress the spring means and release the coupling formations.

7. A filler cap for an opening that extends inwardly from a surface and has locking formations inward of the surface, said filler cap comprising a cap body having an axial bore, peripheral sealing means adapted to seal the opening when the cap body is inserted therein, a control member mounted in the bore of the cap body for rotational and axial movements with respect to the cap body, means defining an innermost axial position of the control member with relation to the cap body, a locking member carried by the control member inwardly of the cap body and axially and rotationally movable with respect to the control member, the locking member being adapted to enter the opening when in one rotational position and to engage the locking formations in the opening when in another rotational position, first and second resilient means urging the control member outwardly with respect to the cap body and with respect to the locking member, respectively, first coupling means releasably engageable between the control member and the locking member in a first rotational relation thereof and by virtue of their relative axial movement in response to said second resilient means, said coupling means providing when engaged a positive driving connection for swinging the locking member between its said rotational positions in the opening, and said coupling means being releasable by manual movement of the control member substantially to said innermost axial position, second coupling means engageable between the control member and the locking member only when the first coupling means is disengaged, and acting by virtue of relative rotation of said members to a second rotational relation to move the locking member outwardly into locking engagement with said locking formations, and stop means limiting outward axial movement of the control member in response to the resilient means to distinct first and second indicating positions when the first coupling means is engaged and the locking member is in its respective said rotational positions in the opening.

8. A filler cap for an opening that extends inwardly from a surface and has a plurality of circumferentially spaced locking formations inward of the surface, said filler cap comprising a cap body, peripheral sealing means adapted to seal the opening when the cap body is inserted therein, radially extending defining formations mounted on the cap body and adapted to enter between adjacent locking formations in at least one predetermined rotational working position of the cap body in the opening, said defining formations engaging the locking formations and preventing rotation of the inserted cap body away from said working position, a locking member mounted on the cap body for rotational and axial movements relative thereto, the locking member having an equal plurality of radially extending arms adapted to pass axially between the locking formations when in a releasing rotational position in the opening and to engage respective locking formations when in a locking rotational position in the opening, stop means acting between the locking member and the cap body to limit said rotational movement of the locking member in one direction at one predetermined angular position and in the other direction at a second predetermined angular position with respect to the cap body, the arms of the locking member being in their said releasing and locking positions in the opening when the locking member is in its said first and second angular positions, respectively, and when the cap body is in its said working position, means for swinging the locking member between its first and second angular positions with respect to the inserted cap body, and means actuable when the locking member is in its second angular position for moving the locking member axially outward with respect to the cap body to tension the sealing means.

9. A filler cap for an opening that extends inwardly from a surface that has an interrupted flange inward of the surface providing a plurality of circumferentially spaced flange sections, said filler cap comprising a cap body having an axial bore, peripheral sealing means adapted to seal the opening when the cap body is inserted therein, a control stud mounted in the bore of the cap body and axially and rotatably movable with respect thereto, a locking member mounted on the stud inwardly of the cap body and axially and rotatably movable with respect to the stud, the locking member having an equal plurality of radially extending arms, structure on the cap body forming axially extending channels adapted to receive respective flange sections when the cap body is inserted in the opening in at least one predetermined rotational working position and to prevent rotation of the inserted cap body away from that working position, stop means fixedly mounted on the cap body in position to engage the locking member and to limit its relative rotation to a predetermined angular range with respect to the cap body, the arms of the locking member, when at one end of said range, being circumferentially spaced intermediate said channels in position to pass between adjacent flange sections, and the arms of the locking member, when at the other end of said range, being aligned with the channels of the cap body in position to engage respective flange sections and thereby to lock the inserted cap in the opening.

10. A filler cap as defined in claim 9 and including also coupling means releasably engageable between the control stud and the locking member, said coupling means when engaged providing a positive driving connection for positively swinging the locking member through its range of rotational movement with respect to the cap body.

11. A filler cap as defined in claim 10 and including also stop means on the cap body in position to permit said swinging of the locking member through its range of movement only when its arms are axially spaced inwardly of the locking formations.

12. A filler cap as defined in claim 9 and including also first coupling means releasably engageable between the control stud and the locking member, said coupling means when engaged providing a positive driving connection for postively swinging the locking member through its said range of rotational movement with respect to the cap body, and second coupling means engageable between the control stud and the locking member only when the first coupling means is disengaged and actuable to cause axial movement of the locking member to tension the sealing means.

13. A filler cap as defined in claim 9 and including also means limiting the outward axial movement of the locking member to first and second predetermined axial positions relative to the cap body when the locking member is at the first and second said ends of its range of rotational movement, said first axial position being outward of the second, spring means urging the control stud outwardly with respect to the cap body, and stop means limiting the outward movement of the control stud with respect to the locking member.

14. A filler cap as defined in claim 9 and including also spring means urging the control stud outwardly with respect to the cap body, and stop means limiting said outward movement of the control stud to one axial position when the locking member is at the first said end of its range of rotational movement and to a second axial position, inward of the first, when the locking member is at the second said end of its rotational range.

References Cited in the file of this patent

UNITED STATES PATENTS

| | | |
|---|---|---|
| 2,093,624 | Twaits et al. | Sept. 21, 1937 |
| 2,347,844 | Sandberg | May 2, 1944 |
| 2,376,593 | Hellen | May 22, 1945 |
| 2,416,637 | Minella | Feb. 25, 1947 |
| 2,597,576 | Donovan | May 20, 1952 |
| 2,616,585 | Condit et al. | Nov. 4, 1952 |